United States Patent
Kokubo

(10) Patent No.: US 7,917,179 B2
(45) Date of Patent: Mar. 29, 2011

(54) TASK DISPLAY SWITCHING METHOD, PORTABLE APPARATUS AND PORTABLE COMMUNICATIONS APPARATUS

(75) Inventor: Takeshi Kokubo, Kanagawa (JP)

(73) Assignee: Mobilemedia Ideas LLC, Chevy Chase, MD (US)

( * ) Notice: Subject to any disclaimer, the term of this patent is extended or adjusted under 35 U.S.C. 154(b) by 5 days.

(21) Appl. No.: 11/514,245

(22) Filed: Sep. 1, 2006

(65) Prior Publication Data
US 2006/0293088 A1    Dec. 28, 2006

Related U.S. Application Data

(62) Division of application No. 10/301,598, filed on Nov. 22, 2002, now Pat. No. 7,123,945.

(30) Foreign Application Priority Data

Nov. 26, 2001   (JP) ................................. 2001-359284

(51) Int. Cl.
 *H04M 3/42* (2006.01)
 *H04B 1/38* (2006.01)
 *G09G 5/00* (2006.01)
 *G06F 3/048* (2006.01)
(52) U.S. Cl. ..................... 455/566; 455/416; 455/414.1; 345/169; 715/790
(58) Field of Classification Search .................. 455/566, 455/416, 414.1; 345/169; 715/790
See application file for complete search history.

(56) References Cited

U.S. PATENT DOCUMENTS

| | | | |
|---|---|---|---|
| 4,651,146 A | 3/1987 | Lucash et al. | 715/806 |
| 5,482,050 A * | 1/1996 | Smokoff et al. | 600/523 |
| 5,757,371 A * | 5/1998 | Oran et al. | 715/779 |
| 5,758,079 A * | 5/1998 | Ludwig et al. | 709/204 |
| 6,240,168 B1 * | 5/2001 | Stanford et al. | 379/110.01 |
| 6,298,422 B1 | 10/2001 | Spilo et al. | 715/154 |
| 6,304,763 B1 | 10/2001 | Jahagirdar et al. | 455/516 |
| 6,385,662 B1 * | 5/2002 | Moon et al. | 719/318 |
| 6,549,302 B1 | 4/2003 | Takeda et al. | 358/1.9 |
| 6,662,022 B1 | 12/2003 | Kanamori et al. | |
| 6,693,652 B1 * | 2/2004 | Barrus et al. | 715/838 |
| 2001/0016508 A1 * | 8/2001 | Kido et al. | 455/575 |
| 2002/0002060 A1 | 1/2002 | Singh et al. | 455/556 |
| 2002/0045438 A1 * | 4/2002 | Tagawa et al. | 455/412 |
| 2002/0077156 A1 | 6/2002 | Smethers | 455/566 |

(Continued)

FOREIGN PATENT DOCUMENTS

JP    5-204731    8/1993

(Continued)

*Primary Examiner* — Ariel Balaoing
(74) *Attorney, Agent, or Firm* — Proskauer Rose LLP

(57) ABSTRACT

A task display switching method, a portable apparatus and a portable communications apparatus which, when a plurality of software applications are activated and processed in parallel, make it possible to switch a display between each of the software applications with ease. According to the task display switching method, a portable apparatus capable of processing a plurality of tasks in parallel and of displaying a plurality of display regions for displaying data, an icon associated with a task displayed on a first display region is generated automatically or manually, and the generated icon is displayed in a second display region. When any icon thus generated is selected from a plurality of icons displayed on the second display region, the task associated with the selected icon is restored and displayed in the first display region.

13 Claims, 14 Drawing Sheets

U.S. PATENT DOCUMENTS

| | | | |
|---|---|---|---|
| 2002/0085043 A1* | 7/2002 | Ribak | 345/810 |
| 2002/0126664 A1* | 9/2002 | Kiiski et al. | 370/389 |
| 2002/0160817 A1* | 10/2002 | Salmimaa et al. | 455/566 |
| 2003/0013483 A1* | 1/2003 | Ausems et al. | 455/556 |
| 2003/0045315 A1 | 3/2003 | Vasa | 455/517 |
| 2003/0232628 A1 | 12/2003 | Fehrm | 455/550.1 |
| 2004/0214610 A1* | 10/2004 | Tanemura et al. | 455/566 |

FOREIGN PATENT DOCUMENTS

JP 2001-237932 8/2001

* cited by examiner

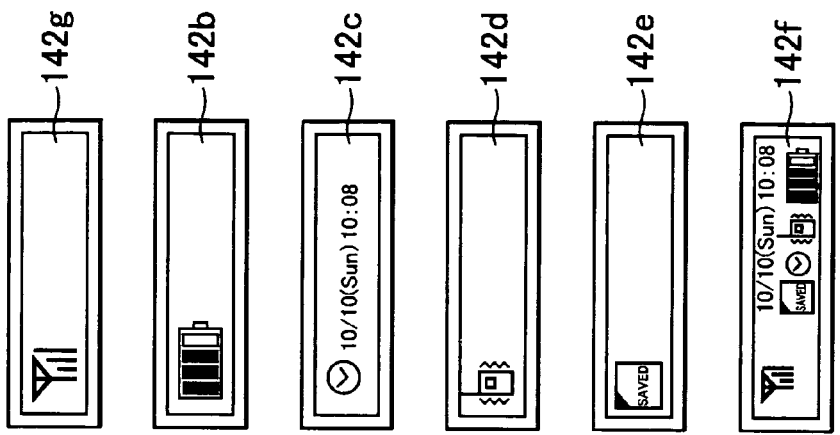
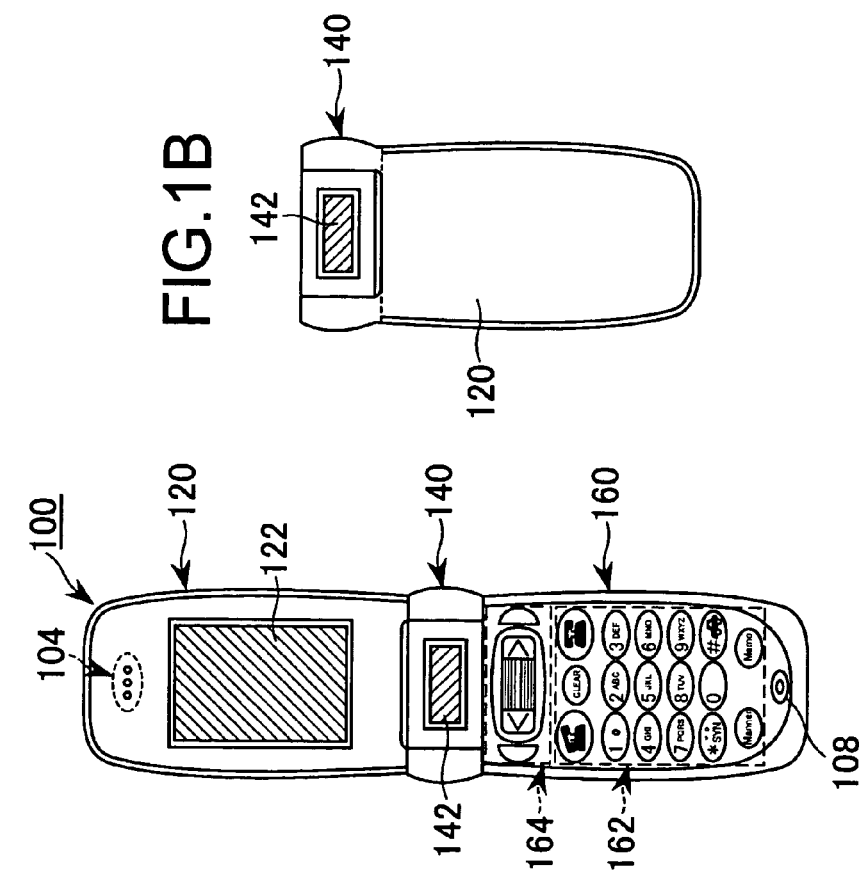

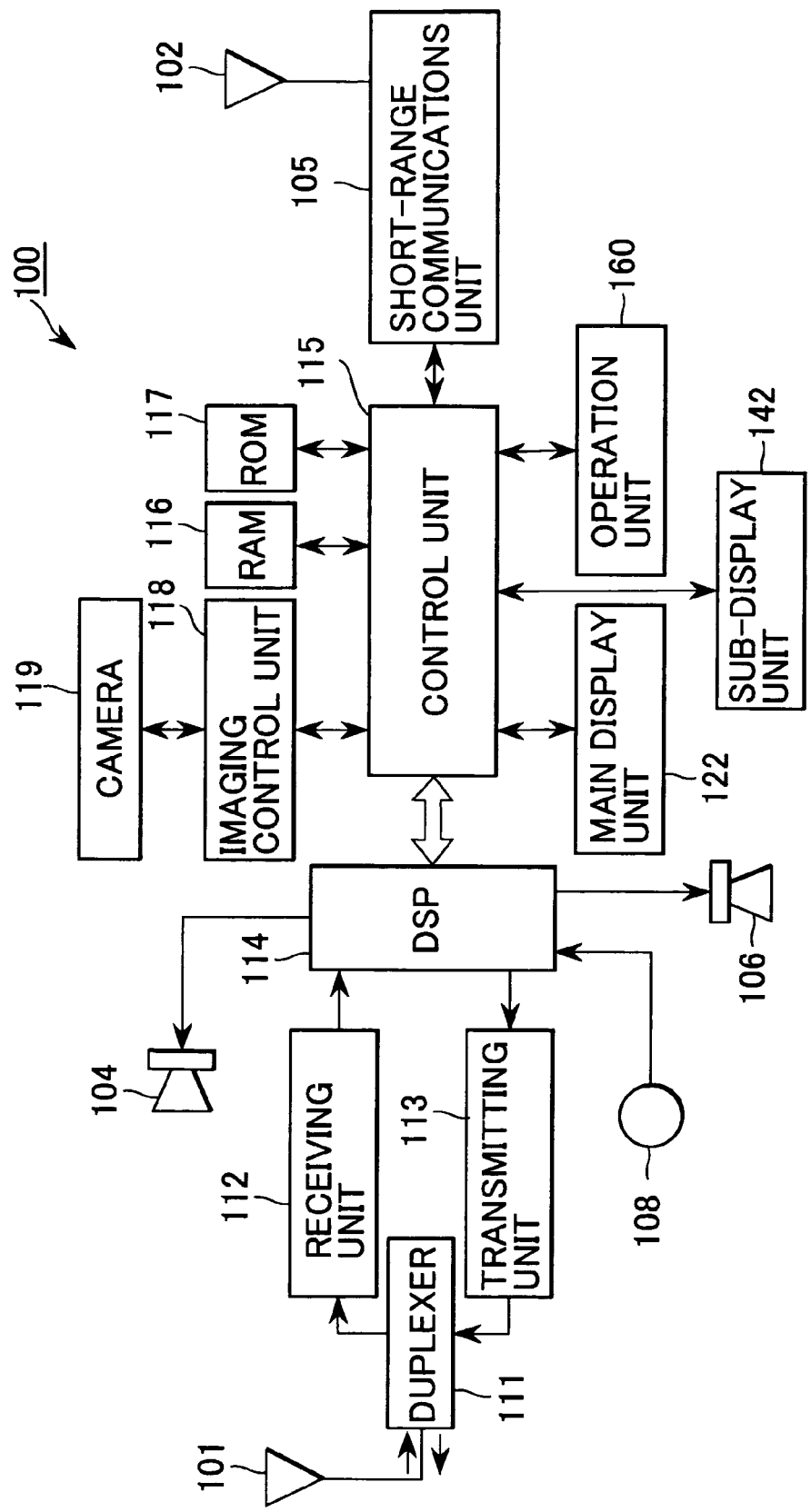

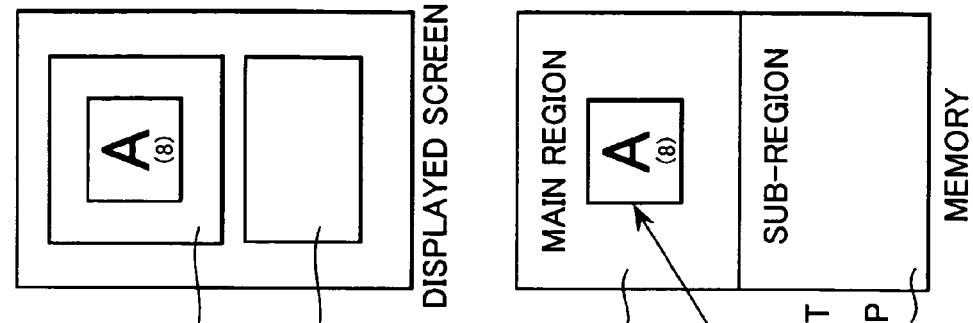
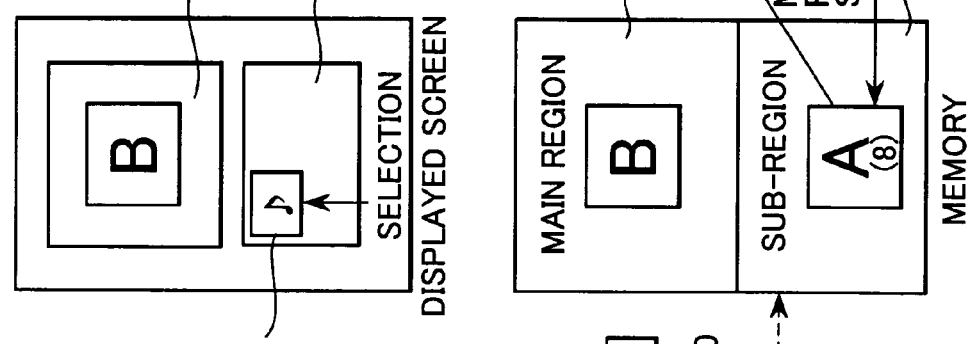
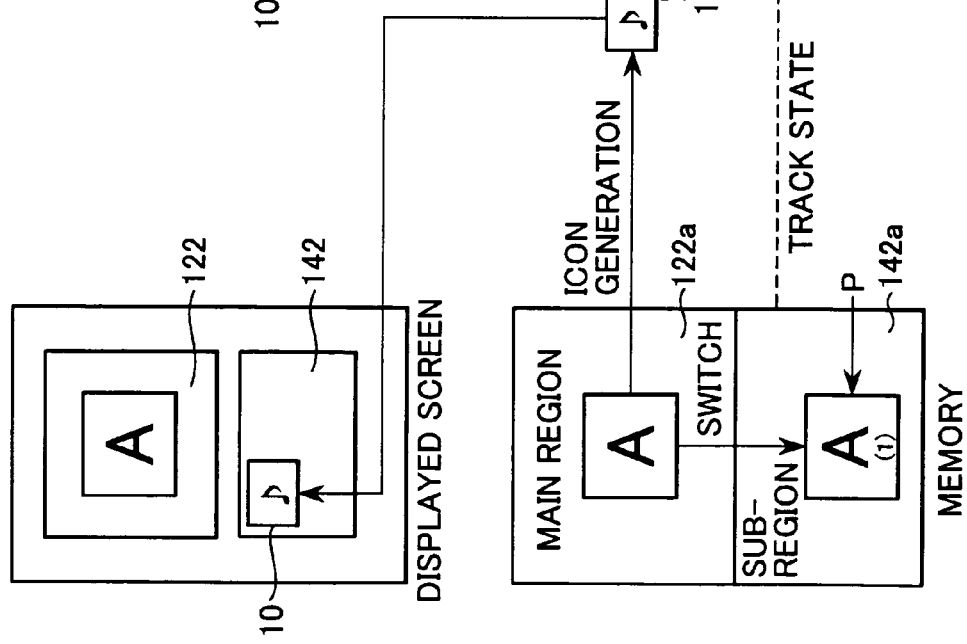

TASK DISPLAY SWITCHING METHOD, PORTABLE APPARATUS AND PORTABLE COMMUNICATIONS APPARATUS

CROSS REFERENCE TO RELATED APPLICATIONS

This application is a divisional of U.S. application Ser. No. 10/301,598, filed Nov. 22, 2002, and is based upon and claims the benefit of priority from the prior Japanese Patent Application No. 2001-359284, filed on Nov. 26, 2001, the entire contents of each of which are incorporated herein by reference.

BACKGROUND OF THE INVENTION

1. Field of the Invention

The present invention relates to a task display switching method, a portable apparatus and a portable communications apparatus. More specifically, the present invention relates to a task display switching method, a portable apparatus and a portable communications apparatus, which, in a case where a plurality of application software are run and processed in parallel in a portable phone apparatus or the like, may easily carry out a switching operation to switch the display to each application software.

2. Description of the Related Art

Technological advances in portable information apparatuses, such as a portable telephone and the like, have been remarkable, and functions such as gaming, digital camera, audio reproduction and communications such as internet connection have been added, thereby improving their multi-functionality. Such advances may be expected to be further fueled with the introduction of the next generation of portable information apparatuses. Also, new technology and new ideas are introduced with respect to the display monitors for these apparatuses, such as color displays, liquid crystal sub-displays and the like.

SUMMARY OF THE INVENTION

However, although the multi-functionality and the introduction of new technology are being advanced as mentioned above, conventional portable information apparatuses have a problem in that in activating and using an additional application software while using some other application software, it is difficult to instantly switch the display between the applications.

Specifically, in portable telephones and the like, in order to access the Internet while writing an e-mail, a user has to save the e-mail and close the e-mail screen. Once the e-mail screen is closed, a top screen is displayed (a screen displayed when the power is turned on). The user selects, for example, "selection menu" from the top screen so that task items are displayed. If the user selects "Internet Connection," for example, from the items, a browser is activated and displayed on the display. Thus, the user can access a desired web site. However, if the user wishes to resume writing an e-mail while browsing a web site, the user must perform a tedious operation, where the user must close the browser to get to the top screen, again select the selection menu from the top screen so that the task items are displayed, select "Create Electronic Mail," for example, and select the previously saved e-mail so that it is displayed on the display.

There also are portable information apparatuses having a screen memo function for storing a displayed screen. However, this function cannot be applied to all displayed screens. Further, in order to display the content of the screen memo, the user must, much like what is described above, get to the selection menu from the top screen and then select, for example, the item "Screen Memo." Thus, in terms of the effort on the part of the user, there is not much of a difference.

On the other hand, in the next generation of portable telephones which will be more multi-functional than those presently available, it may be anticipated that there will arise a need for carrying out a plurality of processes at the same time (parallel processing), such as browsing a web site and listening to music at the same time, while writing an e-mail every now and then. However, with what is available, an operation in which the top screen is displayed, a selection menu is selected, the task items are displayed, and the desired item is selected to activate the desired application software so that it is displayed on the screen becomes an operation sequence for using an application software. And in order to activate and display a different application software, this sequence must be repeated. Hence, there lies a problem in that the switching operation for switching between a plurality of application software processed simultaneously, and having the screen of the desired application software displayed becomes further tedious.

The present invention provides a task display switching method, which can easily carry out a display switching operation to switch between a plurality of application software when they are activated and processed in parallel in a portable information apparatus, and the like.

In order to solve or alleviate the above-mentioned problems, the task display switching method, the portable apparatus and the portable communications apparatus according to the present invention are designed so as to have the following configuration (steps).

In a portable apparatus capable of processing a plurality of tasks (application software) in parallel and of displaying a plurality of display regions which display data, an icon corresponding to a task (application software) displayed in a first display region serving as a main display region is generated automatically or manually, the generated icon is displayed in a second display region serving as a sub-display region. When an icon is selected from the icons displayed in the second display region, the task (application software) corresponding to the selected icon is restored and displayed in the first display region automatically or manually. Consequently, when a plurality of tasks (application software) are processed in parallel, a switching operation for switching between the tasks (application software) may be performed smoothly.

In addition, by automatically or manually generating an icon such that it corresponds to the most recent state of the task, to a state in which the task is suspended or stopped, or to an initial state of the task, and such that the icon is generated by reducing the image displayed in the first display region, and that they are automatically or manually erased from the second display region when restoration is performed, because the icons may be appropriately generated so as to correspond with a predetermined state from among a most recent state, a suspended state and an initial state of the task (application software), the task (application software) may be started in a desired state when resuming the task (application software) in the first (main) display region.

The portable communications apparatus according to the present invention is capable of processing a plurality of tasks in parallel, and comprises a display unit having a first display region for displaying data, a hinge unit having a second display region for displaying data, an operation unit having operating means for receiving commands and input from a user, and an icon generating means for generating icons corresponding to the tasks. The display unit and the operation unit are joined via the hinge unit, and the portable communications apparatus may be opened/closed with the hinge unit as a shaft. The second display region is provided such that it may be viewed when the display unit and the operation unit are rotated and are thereby placed in a closed state, and is designed so as to be able to indicate the status of the apparatus. As such, when the apparatus is in use (opened), it is possible to switch smoothly between multiple tasks (application software) processed in parallel, and even when folded and not in use (closed), data which indicate communication conditions (signal field strength and the like), and the apparatus status such as remaining battery capacity, the time, presence of stored data and the like. Thus, a small display region may be utilized efficiently.

As mentioned above, in multi-functional and downsized (in terms of length, size, weight and thickness) portable apparatuses, such as portable telephones, PDAs and the like, by generating an icon corresponding to the application software (tasks) displayed in the first display region serving as the main display region, displaying the generated icon in the second display region serving as the sub-display region, and selecting the desired icon from the icons displayed in the second display region, the desired application software (task) may be restored and displayed in the first display region. Thus, when a plurality of application software (tasks) are processed in parallel, the switching operation for switching between these application software (tasks) may be performed smoothly, and the ease and speed of the switching operation are improved.

Further, by generating the icons such that they correspond to a predetermined state from among a most recent state, a suspended or stopped state and an initial state of the application software, the application software may be started at the desired state when it is restored and displayed on the main display unit to resume the application software. Thus, the ease and speed of the application software resuming procedure are improved.

In, for example, downloading data, if the downloading screen is continuously displayed on the main display unit (the first display region), the content displayed on the display is frequently updated. However, if an icon is displayed on the sub-display unit (the second display region), there no longer is any need to update the screen. Thus, an embodiment of the present invention also has an advantage in that the power consumed in updating the screen is saved, which leads to lower power consumption.

Further, in a foldable portable communications apparatus, such as a portable telephone, PDA and the like, in which the display unit and the operation unit may be rotated and opened/closed with the hinge unit as a shaft, by providing the second (sub) display region in the hinge unit, and in a position such that the second display region may be viewed when the apparatus is folded (closed), switching operations for switching between a plurality of application software processed in parallel may be performed smoothly while the apparatus is in use (opened), as described above, and, further, even when the apparatus is folded and not in use (closed), the second display region may be utilized effectively by displaying data indicating communication conditions such as the signal field strength, and apparatus conditions such as remaining battery capacity, the time, presence of stored data and the like. Hence, there is an advantage in that the second display region may be used effectively without affecting the size of the apparatus, while at the same time improving the ease and speed of operation.

BRIEF DESCRIPTION OF THE DRAWINGS

FIGS. 1A and 1B are external views of a foldable portable telephone according to the present invention;

FIG. 1C is an explanatory view illustrating display examples for a display unit;

FIG. 2 is a block diagram schematically showing the inner configuration of the portable telephone shown in FIGS. 1A and 1B;

FIGS. 4A through 4C are explanatory views schematically showing the relationship between the internal state of a memory and the main and sub-display units in a case where the pointer type icon is used in the portable telephone shown in FIGS. 1A and 1B;

DESCRIPTION OF THE PREFERRED EMBODIMENTS

Figure 3:
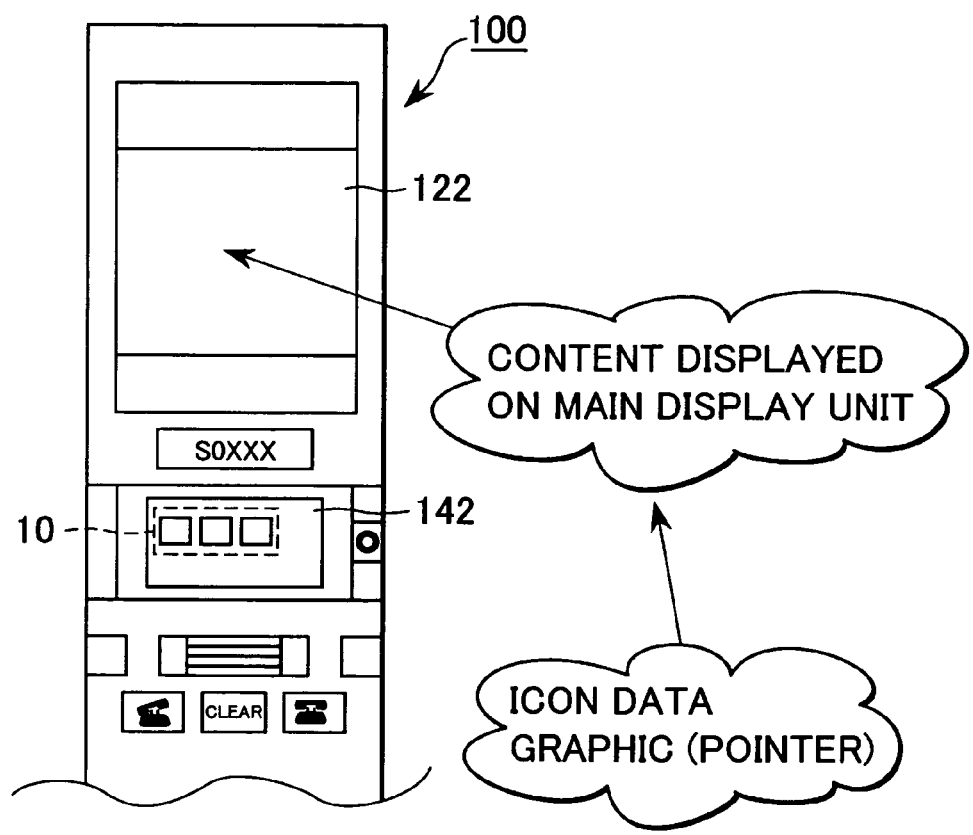
FIG. 3 is an explanatory view schematically showing the relationship between a main display unit and a pointer type icon in the portable telephone shown in FIGS. 1A and 1B.

Embodiments of a task display switching method, a portable apparatus and a portable communications apparatus according to the present invention will be described below with reference to the attached drawings. However, the drawings are presented for purposes of explanation only, and the technical scope of the present invention is not limited thereto.

The portable telephone shown in FIGS. 1A and 1B is an example of an embodiment of the portable apparatus and portable communications apparatus according to the present invention. What is shown is a foldable portable telephone 100, which is equipped with functions such as accessing the Internet or the like to browse websites, and creating, transmitting and receiving e-mail and the like.

FIG. 1A is an external view of the portable telephone 100 in use, and there are shown a display unit 120 having a main display unit 122, a hinge unit 140 on which a sub-display unit 142 is provided, and an operation unit 160 for performing operations with, such as inputting data.

The display unit 120 and the operation unit 160 are connected via the hinge unit 140, and are rotatable with the hinge unit 140 serving as a shaft so as to be opened/closed. FIG. 1B shows the portable telephone 100 at rest (closed and not in use), and the display unit 120 and the operation unit 160 are folded with the hinge unit 140 as a shaft so as to overlap.

The display unit 120 has the main display unit 122 as a first display region for displaying, for example, an e-mail screen or a web browser, and a speaker 104 for telephone calls and the like. The display unit 120 is rotatably connected to the operation unit 160 via the hinge unit 140.

The hinge unit 140 is provided with the sub-display unit 142 for displaying one or more icons each corresponding to an application software (task) and so forth, or data and the like. The hinge unit 140 rotatably connects the display unit 120 and the operation unit 160. In addition, the sub-display unit 142 is provided in a position such that the displayed content may be viewed from outside even when the portable telephone is not in use (i.e. when the display unit 120 and the operation unit 160 are folded such that they overlap) (refer to FIG. 1B).

The operation unit 160 may have: input/call keys 162, such as numerical keys, a manner button, a memo button, a call button, a clear button, an end button and the like; operation keys 164 for moving a cursor up, down, right or left in the screen on the main display unit 122 and/or sub-display unit 142, scrolling, confirming and executing an operation, specifying a data range and the like; a microphone 108 for use during a telephone conversation and the like, and the operation unit 160 is rotatably connected to the display unit 120 via the hinge unit 140.

In FIG. 2, the portable telephone 100 of FIGS. 1A and 1B is shown to have an inner configuration as illustrated. In FIG. 2, there are shown an antenna 101, the speaker 104 for use during, for example, a telephone conversation, an apparatus speaker 106, the microphone 108 for use during a telephone conversation, a duplexer 111, a receiving unit (RX) 112, a transmitting unit (TX) 113, a DSP (Digital Signal Processor) 114, a control section 115, a RAM (Random Access Memory) 116, a ROM (Read Only Memory) 117, the operation unit 160, the main display unit 122 and the sub-display unit 142. Moreover, there are shown an imaging control unit 118, a camera 119, an antenna 102 and a short-range wireless communications unit 105.

The antenna 101 is connected to the duplexer 111. During a receiving operation, a signal received by the antenna 101 is sent to the duplexer 111. During a transmitting operation, a transmission signal from the duplexer 111 is sent to the antenna 101, and a radio signal is radiated from the antenna 101.

The duplexer 111 is connected to the antenna 101, the receiving unit (RX) 112 and the transmitting unit (TX) 113. During the receiving operation, the signal received by the antenna 101 is sent to the receiving unit (RX) 112 through the duplexer 111. During the transmitting operation, the transmission signal from the transmitting unit (TX) 113 is sent to the antenna 101 through the duplexer 111.

The receiving unit (RX) 112 is connected to the duplexer 111 on one end, and to the DSP 114 on the other end. The receiving unit (RX) 112 demodulates the reception signal from the duplexer 111 and sends the demodulated signal to the DSP 114. The transmitting unit (TX) 113 is connected to the duplexer 111 on one end, and to the DSP 114 on the other end. The transmitting unit (TX) 113 modulates the transmission signal from the DSP 114, and sends the modulated signal to the duplexer 111.

The speaker 104 and the apparatus speaker 106 are connected to the DSP 114, and they output audio signals processed by the DSP 114. Also, the microphone 108 is connected to the DSP 114, and sends inputted audio to the DSP 114 for processing.

The DSP (Digital Signal Processor) 114 is connected to the transmitting unit (TX) 113, the receiving unit (RX) 112, the speaker 104 for use during a telephone conversation, the apparatus speaker 106, the microphone 108 and the control unit 115. Under the control of the control unit 115, the DSP 114 processes audio input from the microphone 108 or reception signals from the receiving unit (RX) 112, and outputs the processed signals to the speaker 104, or processes data and the like from the control unit 115, and outputs the processed data to the transmitting unit (TX) 113 or the apparatus speaker 106.

The control unit 115 is connected to the DSP 114, the operation unit 160, the RAM 116, the ROM 117, the main display unit 122, the sub-display unit 142, the imaging control unit 118 and the short-range wireless communications unit 105. The control unit 115 controls the respective connected units in accordance with a control program in the ROM 117 (or the RAM 116).

The RAM (Random Access Memory) 116 is connected to the control unit 115, and is capable of performing parallel processing of a plurality of application software (tasks). The RAM 116 performs data processing in accordance with the control unit 115, and, for example, switching processes for switching between application software (tasks) to be displayed on the main display unit 122 or the sub-display unit 142 are executed. The tasks mentioned above are not limited to application software, and may include, for example, phone call information (such as cumulative call time), a transmission log, and an icon corresponding to a screen for showing such information may be generated.

The ROM (Read Only Memory) 117 is connected to the control unit 115, and stores a control program (an operating system) for controlling the apparatus, identification information (telephone number, apparatus number and the like), a plurality of application software (tasks), image data of one or more icons, and the like. Under the control of the control unit 115, required information (data) and programs are sent to the RAM 116 and the like as needed.

The operation unit 160 is connected to the control unit 115, and, via the control unit 115, gives operation instructions, such as inputting text, placing a phone call, display switching and the like by way of the input/call keys 162 or the operation keys 164 (refer to FIG. 1A).

The main display unit 122 is connected to the control unit 115. As the first display region, the main display unit 122 follows instructions from the control unit 115, and displays application software (tasks) in the form of, for example, an e-mail screen, a web browser or the like.

The sub-display unit 142 is connected to the control unit 115. As the second display region, the sub-display unit 142 follows instructions from the control unit 115, and displays one or more icons each generated in correspondence with an application software (task) displayed on the main display unit 122, data and the like. If the apparatus is not in use (closed), the sub-display unit 142 displays, as shown in FIG. 1C, apparatus statuses, such as signal field strength (142*g*), remaining battery capacity (142*b*), the time (142*c*), information on apparatus settings, such as whether manner mode is on or off, for example) (142*d*), presence of stored data (stack) (142*e*) and the like, through icons and the like. Moreover, it is naturally possible to display these icons indicating the respective apparatus statuses in combination as in 142*f*.

The antenna 102 is connected to the short-range wireless communications unit 105, and transmits and receives radio waves for short-range wireless communications such as infrared communications (IrDA) or Bluetooth.

The short-range wireless communications unit 105 is connected to the antenna 102 on one end, and is connected to the control unit 115 on the other end. The short-range wireless communications unit 105 establishes a connection with, for example, a laptop personal computer complying with the blue-tooth specification, a PDA (Personal Digital Assistant), another portable telephone or the like without a cable, and transmits and receives voice or data.

The imaging control unit 118 is connected to the camera 119 on one end, and to the control unit 115 on the other end. The imaging control unit 118 imports a captured image data from the camera 119, and performs image data processing such as displaying the captured image on the main display unit 122 (or the sub-display unit 142) via the control unit 115, or storing the captured image in the RAM 116 and the like.

The camera 119 is connected to the imaging control unit 118, and sends an image which has been shot to the imaging control unit 118.

The relationship between the icon displayed on the sub-display unit 142 and the screen displayed on the main display unit 122 in the portable telephone 100 shown in FIGS. 1A and 1B and FIG. 2 will be described below.

The icon displayed on the sub-display unit 142 is classified broadly into (1) a pointer type, (2) a copy type and (3) a reduction type.

[1] Pointer Type Icon

As shown schematically in FIG. 3, the pointer type icon is an icon which is generated in correspondence with the processing of the task displayed on the main display unit 122 while the task is active. When the pointer type icon is selected, the most recent state of the task corresponding to this icon is restored and displayed on the main display unit 122.

FIGS. 4A through 4C are diagrams schematically showing the relationship between the internal state of the memory and the main and sub-display units 122 and 142. The task displayed on the main display unit 122 is executed in a main region 122*a* in the memory, and a different task of which processing is continuing is stored in a sub-region 142*a*, and the task is displayed as a pointer type icon on the sub-display unit 142.

In FIG. 4A, task (A) is currently executed, and the task (A) is displayed on the main display unit 122. It is assumed that nothing is displayed on the sub-display unit 142.

In order to switch to a different task (B) while the processing of the task (A) is continued, if the operation keys 164 and the like are used to start the task (B), a pointer type icon 10 corresponding to the task (A) is automatically or manually generated, and the icon 10 is displayed on the sub-display unit 142. At this point, in the memory, the task (A) processed in the main region 122*a* corresponding to the main display unit 122 is switched to the sub-region 142*a*, and the task (A) is monitored by a pointer P.

On the other hand, as shown in FIG. 4B, the task (B) begins processing in the main region 122*a*, and the task (B) is displayed on the main display unit 122. At this point, processing of the task (A) is continued in the sub-region 142*a* in the memory, and the most recent states (A(1)) . . . (A(n)) thereof are monitored by the pointer P.

If the task (B) is terminated, stopped or suspended as shown in FIG. 4C, the task executed in the main region 122*a* is automatically switched from the task (B), currently under execution, to the task (A). The most recent state (A(8)), for example, of the task (A) monitored by the pointer P is restored in the main region 122*a*, and the most recent state (A(8)) of the task (A) is displayed on the main display unit 122. At the same time, the icon 10 (corresponding to task (A)) is erased from the sub-display unit 142 (and the sub-region 142*a*). However, it is also possible to keep the icon 10.

The automatic task switching operation may be such that switching to a task that was activated immediately before as described above, or to a predefined or arbitrarily specified task is performed.

Alternatively, when terminating, stopping or suspending the task (B), switching from the task (B) to the task (A) may be done by performing a predetermined operation with the operation keys 164 and the like to switch from the main display unit 122 to the sub-display unit 142, and then selecting the icon 10 corresponding to the task (A).

[2] Copy Type Icon

Figure 5:
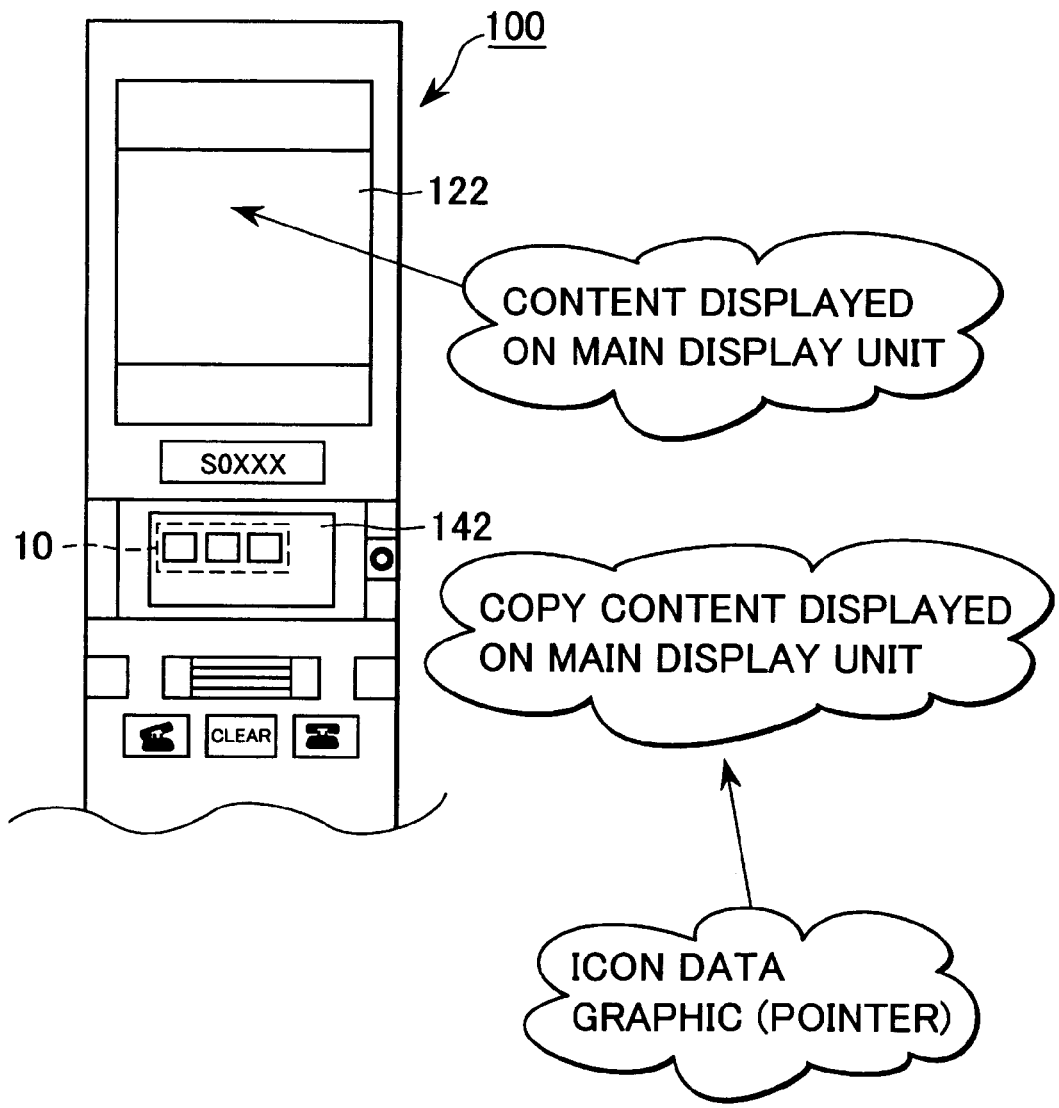
FIG. 5 is an explanatory view schematically showing the relationship between the main display unit and a copy type icon in the portable telephone shown in FIGS. 1A and 1B.

The copy type icon, as shown schematically in FIG. 5, is an icon generated in correspondence with the task displayed on the main display unit 122 in a suspended or stopped state, or in a state in which the initial state is maintained (copied). When the copy type icon is selected, the task corresponding to this icon is restored and displayed on the main display unit 122 in a state at which the task was suspended or stopped, or in its initial state.

Figure 6:
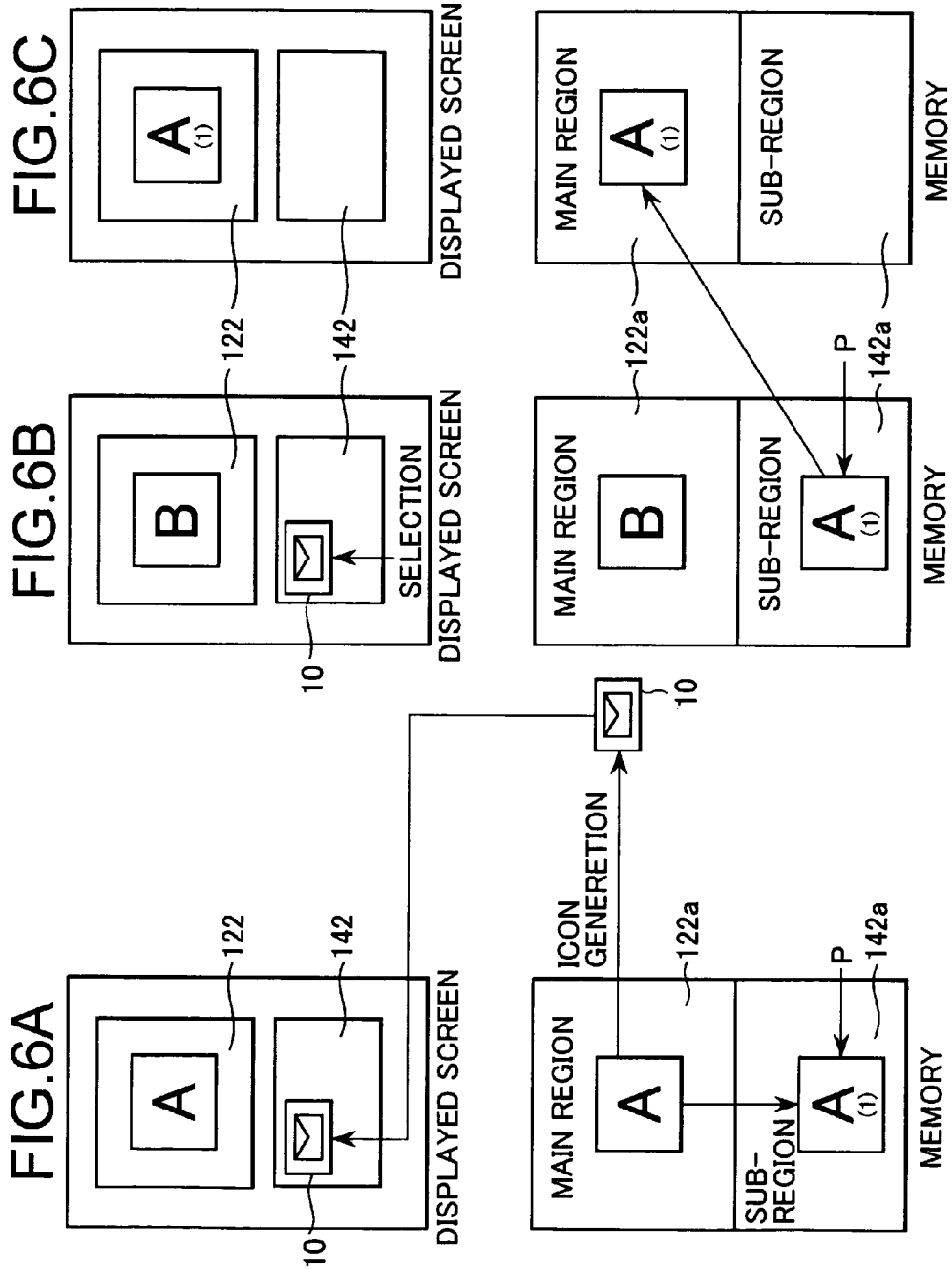
FIGS. 6A through 6C are explanatory views schematically showing the relationship between the internal state of the memory and the main and sub-display units in a case where the copy type icon is used in the portable telephone shown in FIGS. 1A and 1B.

FIGS. 6A through 6C are diagrams schematically showing the relationship between the internal state of the memory and what is displayed on the main and sub-display units 122 and 142 when the copy type icon is used. The task displayed on the main display unit 122 is executed in the main region 122*a* in the memory, and a different task in its initial state or in a state in which processing is suspended (stopped) is stored in the sub-region 142*a*, and is displayed as the copy type icon on the sub-display unit 142.

In FIG. 6A, the task (A) is being executed, and the task (A) is displayed on the main display unit 122. It is assumed that nothing is displayed on the sub-display unit 142.

In suspending (stopping) a task (A) and switching to a different task (B), if the task (B) is activated through a predetermined operation using the operation keys 164 and the like, a copy type icon 10 corresponding to the task (A) is automatically or manually generated, and the icon 10 is displayed on the sub-display unit 142. At this point, in the memory, processing of the task (A) which is undergoing processing in the main region 122*a* corresponding to the main display unit 122 is switched to the sub-region 142*a* in a state in which the processing of the task (A) is suspended (stopped) or in its initial state, and the task (A) is monitored by the pointer P such that it is activated in the suspended (or stopped) state or in its initial state.

On the other hand, as shown in FIG. 6B, the activated task (B) begins processing in the main region 122*a*, and the task (B) is displayed on the main display unit 122. At this point, in the sub-region 142*a* of the memory, the task (A) is still in the suspended (stopped) or initial state (A(1)).

If the task (B) is terminated, stopped or suspended, as shown in FIG. 6C, automatic switching from the task (B) under execution in the main region 122*a* to the task (A) is performed. The task (A) monitored by the pointer P is restored in the main region 122*a* in the state (A(1)) at which processing thereof was previously suspended (stopped), and the task (A) in the state (A(1)) is displayed on the main display unit 122. The icon 10 is erased from the sub-display unit 142 (and the sub-region 142a). However, it is also possible to keep the icon 10.

The automatic task switching operation may be such that switching to an immediately preceding task, or to a predefined or arbitrarily defined task is performed.

Moreover, in terminating, stopping, or suspending the task (B), a predetermined operation using the operation keys 164 and the like may be carried out to switch from the main display unit 122 to the sub-display unit 142, and the icon 10 of the task (A) may be selected to thereby switch from the task (B) to the task (A).

[3] Reduction Type Icon

Figure 7:
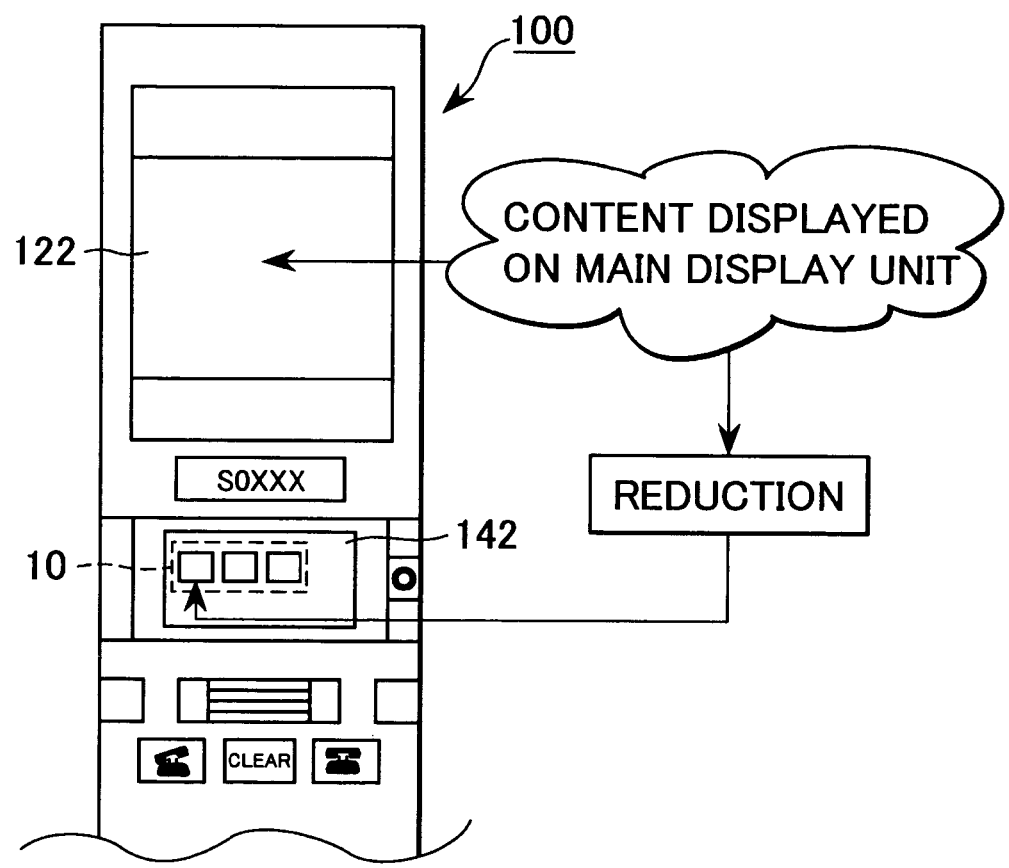
FIG. 7 is an explanatory view schematically showing the relationship between the main display unit and a reduction type icon in the portable telephone shown in FIGS. 1A and 1B.

The reduction type icon, as shown schematically in FIG. 7, is an icon generated by reducing the screen of the task displayed on the main display unit 122 as it is. Much like the pointer type icon mentioned above, the reduction type icon may restore and display the most recent state of a task on the main display unit 122 (reduction pointer type). Alternatively, the reduction type icon may also restore a task in the state in which it was suspended (or stopped) or in its initial state, and display the task on the main display unit 122, as in the case of the copy type icon, (reduction copy type).

Further, if the icon displayed on the sub-display unit 142 is capable of tracking changes in the state of the task and of changing itself in accordance therewith, much like a sub-window in a television with PinP (Picture-in-Picture) functions, checking the state of the task with the icon itself may be made possible.

Figure 8:
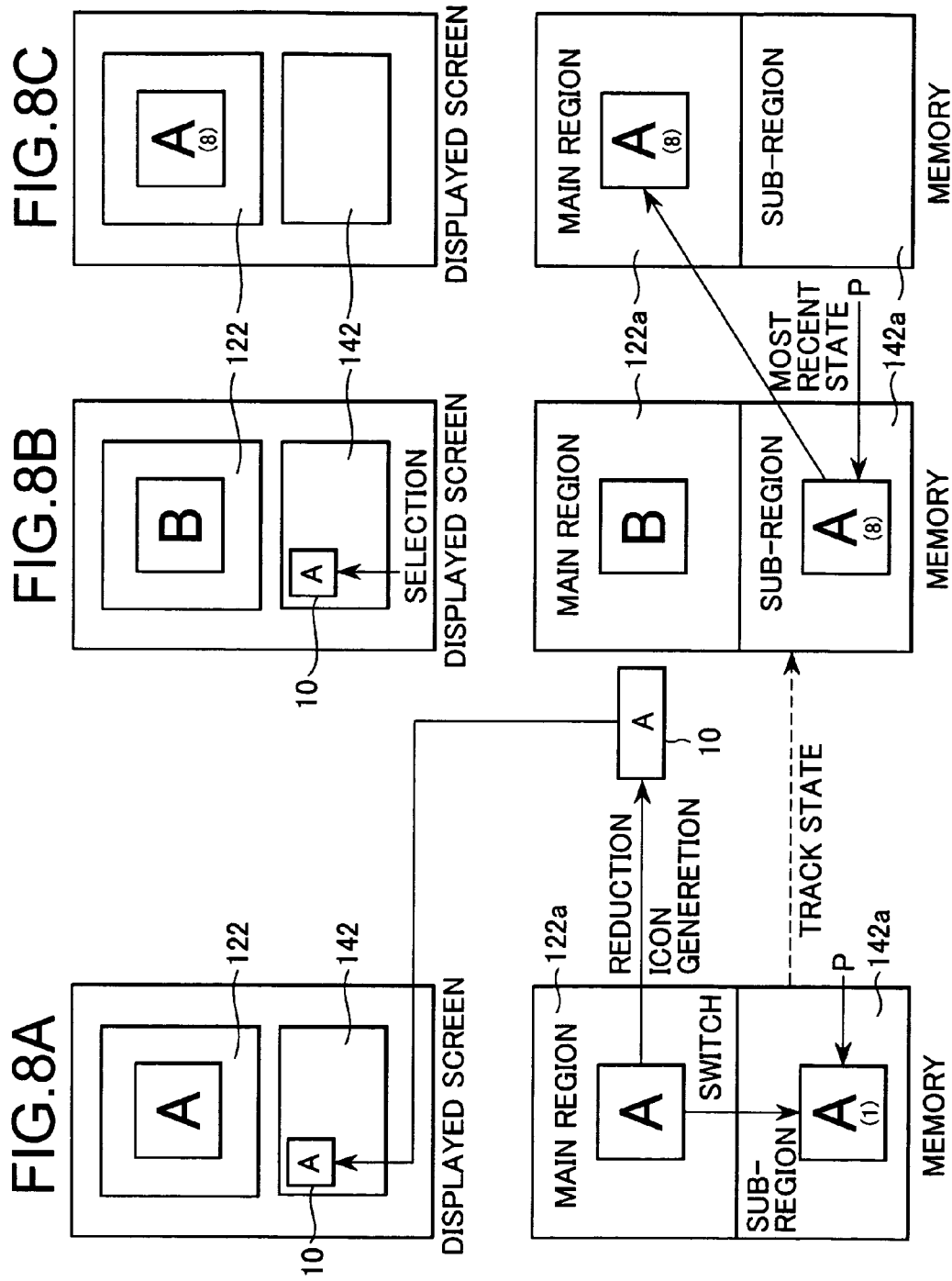
FIGS. 8A through 8C are explanatory views schematically showing the relationship between the internal state of the memory and the main and sub-display units in a case where the reduction type icon is used in the portable telephone shown in FIGS. 1A and 1B.

FIGS. 8A through 8C are diagrams schematically showing the relationship between the internal state of the memory and what is displayed on the main and sub-display units 122 and 142 when the reduction type icon is used. The task displayed on the main display unit 122 is executed in the main region 122a in the memory, and a different task in a state in which processing is ongoing or suspended (stopped), or in an initial state is stored in the sub-region 142a, and the task is displayed as a copy type icon on the sub-display unit 142.

In FIG. 8A, a task (A) is executing, and the task (A) is displayed on the main display unit 122. It is assumed that nothing is displayed on the sub-display unit 142.

In switching to a different task (B) while the processing of the task (A) is continued, if the task (B) is activated through a predetermined operation with the operation keys 164, a reduction type icon 10, which corresponds to the task (A) and in which the displayed screen is reduced in scale by lowering the resolution thereof, is automatically or manually generated, and the icon 10 is displayed on the sub-display unit 142. At this point, in the memory, the task (A) processed in the main region 122a corresponding to the main display unit 122 is switched to the sub-region 142a, and the task (A) is monitored by a pointer P.

On the other hand, as shown in FIG. 8B, processing of the activated task (B) is started in the main region 122a, and the task (B) is displayed on the main display unit 122. At the same time, processing of the task (A) is continued in the sub-region 142a in the memory, and the most recent states (A(1)) . . . (A(n)) thereof are monitored by the pointer p.

When the task (B) is terminated, stopped or suspended the task executed in the main region 122a is automatically switched, as shown in FIG. 8C, from the task (B) to the task (A). The most recent state (A(8)) of the task (A) monitored by the pointer P is restored in the main region 122a, and the most recent state (A(8)) of the task (A) is displayed on the main display unit 122. At the same time, the icon 10 (task (A)) is erased from the sub-display unit 142 (and the sub-region 142a). However, it is also possible to keep the icon 10.

In the automatic task switching operation, it is possible to switch to the immediately preceding task as described above, or it is also possible to switch to a predefined or arbitrarily defined task.

Moreover, in terminating, stopping or suspending the task (B), switching from the task (B) to the task (A) may be performed by switching from the main display unit 122 to the sub-display unit 142 through a predetermined operation with the operation keys 164 or the like, and then selecting the icon 10 of the task (A).

Alternatively, without switching from the main display unit 122 to the sub-display unit 142, the icon 10 of the sub-display unit 142 may be selected by, for example, a special operation such as pushing the jog dial (scroll key) of the operation keys 164 and "*" of the input/call keys 162 at the same time.

The description of the reduction type icon above is given with respect to a reduction pointer type icon in which the most recent state of the task corresponding to the icon is displayed (restored) on the main display unit 122 in a fashion similar to the pointer type icon. However, it is also possible to generate a reduction copy type icon which performs an operation similar to the copy type icon in which a task corresponding to the icon is displayed (restored) on the main display unit 122 in the state at which the task was suspended or stopped, or in its initial state.

A specific example of the operations of the portable telephone 100 as it is used while switching between a plurality of application software (tasks) using the pointer type/copy type/reduction type icons mentioned above will be described below with reference to a flowchart shown in FIG. 9.

The operation of the portable telephone 100 is started when the portable telephone 100 is turned on, and it is ended unconditionally when the power is turned off. The portable telephone 100 is, for example, equipped with functions such as creation, transmission and reception of e-mail, accessing and browsing the Internet, gaming, taking pictures, placing phone calls, music reproduction and the like as application software (tasks). The portable telephone 100 is capable of processing a plurality of application software (tasks) in parallel, and of generating icons for each of the application software (tasks) and switching between the tasks.

First, when the portable telephone 100, of which the display unit 120 and the operation unit 160 are folded together in a closed position, is opened so as to be operable, the main display unit 122 and the sub-display unit 142 become viewable (refer to FIG. 1A), and a preset top screen is displayed (ST100). Then, when a predetermined operation is performed with the input/call keys 162 or the operation keys 164 of the operation unit 160, and an application software, for example, a web browser if accessing the Internet, is activated, the web browser is displayed on the main display unit 122, and the content displayed on the main display unit 122 is updated in accordance with processings and operations performed (ST101, 102).

When an application software such as the web browser or the like is activated, it is judged whether or not icon generation is in automatic generation mode (ST103).

If icon generation is in automatic generation mode, a predetermined data is retrieved from the RAM 116 or the ROM 117 to generate the icon 10 (for the web browser, in this case), or the icon 10 (for the web browser) in which the screen on the main display unit 122 is reduced is generated, and the generated icon 10 is displayed on the sub-display unit 142 (ST104, 105).

If, on the other hand, icon generation is not automatic, it is then selected whether or not the icon is to be generated manually (ST106).

In order to generate an icon manually, a predetermined operation is performed with the operation keys 164 and the like, and, as in the case above, a predetermined data is retrieved from the RAM 116 or the ROM 117, thereby generating the icon 10 (for the web browser), or alternatively, the icon 10 (for the web browser) may be generated by reducing the content displayed on the main display unit 122 (ST104). The icon 10 (for the web browser) thus generated is displayed on the sub-display unit 142 (ST105). If the icon is not to be generated manually, the operational flow proceeds to the processing of the application software (in this case, the web browser).

Subsequently, if a different application software, for example, an application software for writing e-mail, is activated, it is judged whether or not an icon 10 for this application software is already generated and displayed on the sub-display unit 142 (ST108). In this case, it is judged whether or not the icon for the e-mail application software is displayed (present) on the sub-display unit 142.

If the icon 10 (for the e-mail application) is displayed (generated) on the sub-display unit 142 (i.e. if the application is active), switching to the application software corresponding to the icon 10, in this case, the e-mail software, is performed, and the e-mail screen is displayed on the main display unit 122, and the content displayed is updated regularly in accordance with processings and operations performed (ST108→ST110→ST111→ST102 . . . ).

If the icon (for the e-mail application) is not displayed (generated) on the sub-display unit 142, it is judged whether or not the application software (the e-mail application), whose activation is requested, is in automatic icon generation mode (ST103).

In automatically generating the icon, a predetermined data is retrieved from the RAM 116 or the ROM 117 to generate the icon 10 (for the e-mail application), or, alternatively, the icon 10 (for the e-mail application) may be generated by reducing the content displayed on the main display unit 122. The icon 10 thus generated is displayed on the sub-display unit 142 (ST103, ST104, ST105).

If icon generation is not automatic, it is then selected whether or not the icon is to be generated manually (ST106).

In the case of manual generation, a predetermined operation is performed with the operation keys 164 and the like, and, as in the case above, predetermined data is retrieved from the RAM 116 or the ROM 117 and the icon 10 (for the e-mail application) is generated, or the icon 10 (for the e-mail application) in which the content displayed on the main display unit 122 is reduced is generated. The icon 10 thus generated is displayed on the sub-display unit 142 (ST104, 105). If the icon is not to be generated manually, the operational flow proceeds to the processing of the application software (in this case, the e-mail application).

Desired processing is performed with the application software (the e-mail application) currently displayed on the main display unit 122, and it is then selected whether or not processing of the application software (the e-mail application) is to be terminated (ST109).

If the processing is not terminated, operation of the application software (the e-mail application) is continued (ST109→ST102 . . . ).

If processing is terminated, it is judged whether or not the icon 10 of the application software (the e-mail application) is present (displayed) on the sub-display unit 142 (ST109→ST112).

If the icon is present on the sub-display unit 142, it is then selected whether or not the icon is to be erased from the sub-display unit 142 (ST114).

In erasing the icon, it is judged whether the icon is to be erased automatically or manually (ST115). The icon 10 (and the data in the memory) is then erased from the sub-display unit 142 (and the sub-region 142*a* of the memory) automatically or through a predetermined operation of the keys or the like (ST116). If the icon is not to be erased, the icon 10 (for the e-mail application) is kept on the sub-display unit 142 (and the sub-region 142*a* of the memory).

If the icon is not present on the sub-display unit 142, it is judged whether or not there are any other active application software (ST112→ST113).

If there is another active application software, it is switched to this application software, which is displayed on the main display unit 122. The process is then continued (ST113→ST102→ . . . ).

On the other hand, if there are no other active application software, the pre-set top screen is displayed (ST115→ST113→ST100).

Specific examples of the mobile phone 100 in use will be described below with reference to FIGS. 10 through 13, based on the operation flow shown in FIG. 9.

Figure 10:
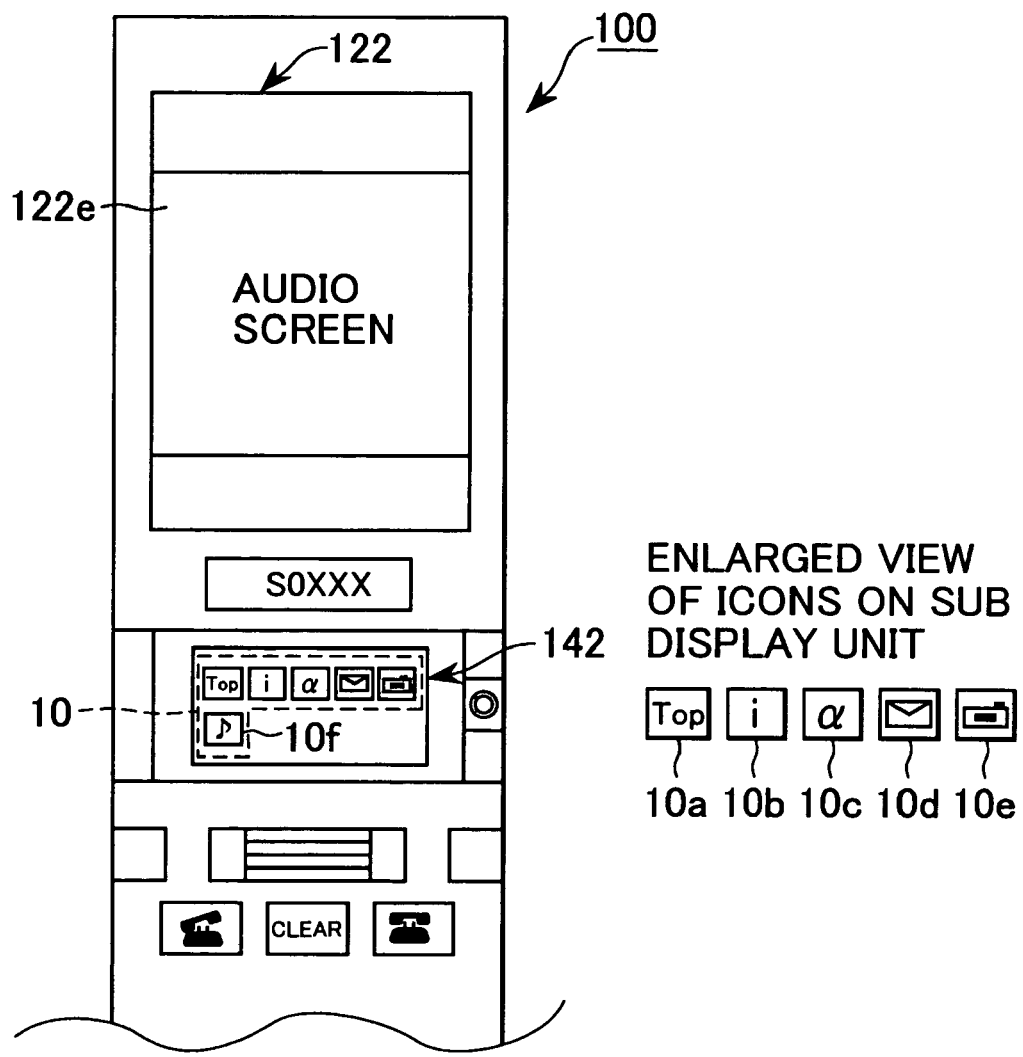
FIG. 10 is an explanatory view showing an example of a specific operation of the portable telephone shown in FIGS. 1A and 1B.

In the portable telephone 100 shown in FIG. 10, an audio screen 122*e* is displayed on the main display unit 122, reproduction processing of audio data is carried out, and a plurality of the icons 10 are displayed on the sub-display unit 142.

For the icons 10 displayed on the sub-display unit 142, there are pre-set, in the upper row from the left, a top (initial) screen icon 10*a*, an icon 10*b* for connecting to the Internet, an icon 10*c* for executing a Java (R) program, an icon 10*d* for e-mail and an icon 10*e* for operating the camera 119. In this example, these icons 10 are always displayed on the sub-display unit 142 in the upper row. In the bottom row, an icon for an active application software under processing or displayed on the main display unit 122 is displayed. In FIG. 10, an icon 10*f* for audio is displayed.

The always-displayed icons 10*a* to 10*e* displayed on the upper row of the sub-display unit 142 are copy type icons. When these icons are selected, a preset screen for each application software is displayed on the main display unit 122.

On the other hand, as for the icon displayed on the lower row of the sub-display unit 142, if it is a copy type (or a reduction copy type), display/erasure thereof is selected manually, and if it is a pointer type (or a reduction pointer type), it is automatically displayed/erased in accordance with the activation/termination of the corresponding application software.

For example, if, as shown in FIG. 10, the portable telephone 100 is used for listening to music, the audio player software is active, and the audio screen 122*e* is displayed on the main display unit 122, and a manually or automatically generated "♪" icon 10*f* is displayed on the sub-display unit 142.

Figure 11:
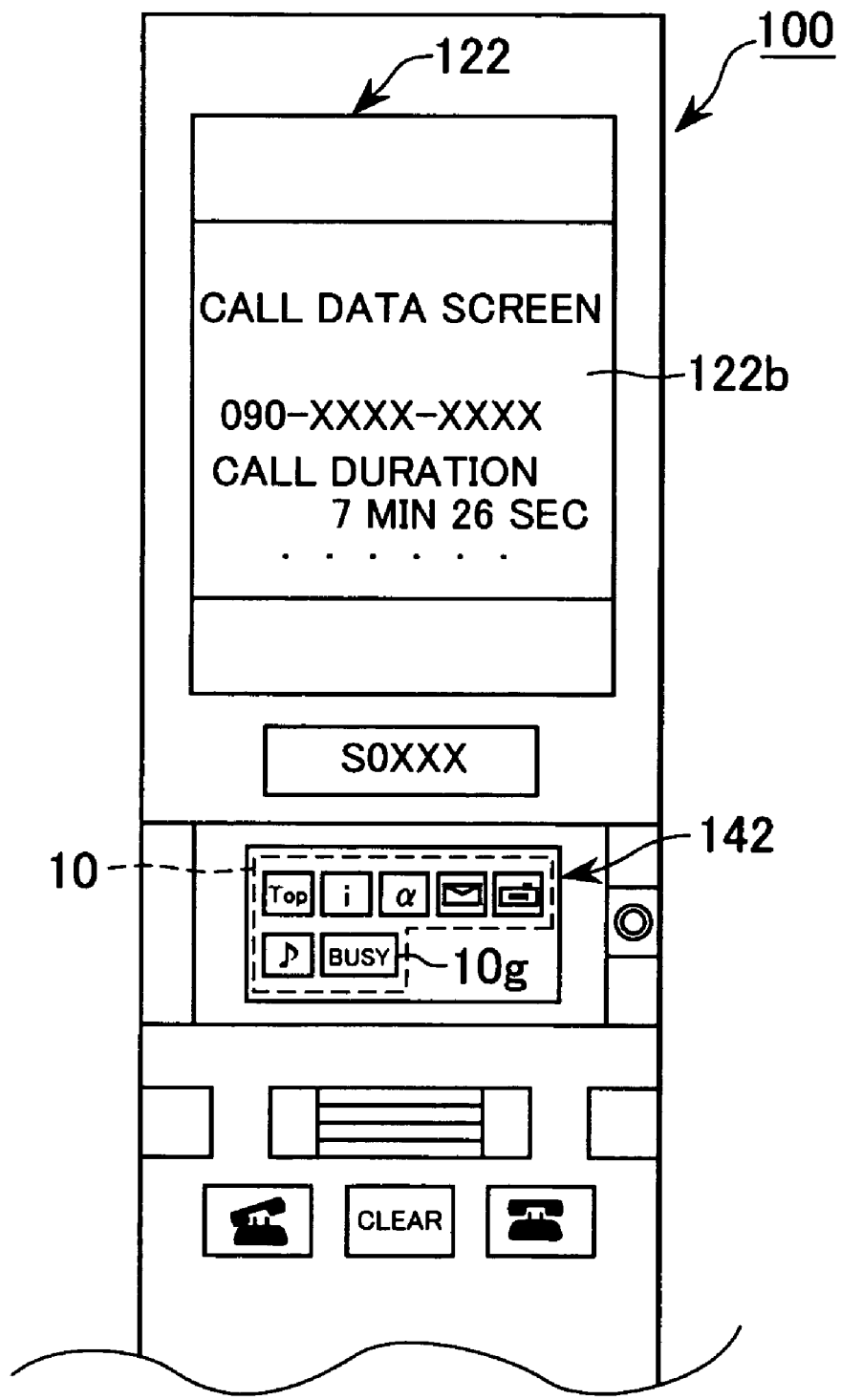
FIG. 11 is an explanatory view showing an example of a specific operation of the portable telephone shown in FIGS. 1A and 1B.

If under such circumstances, a telephone call is received, it is automatically switched from the audio player software to a telephone call software (or by operating the input/call keys 162). As shown in FIG. 11, the main display unit 122 switches to a call data screen 122*b* which displays the telephone number of the person on the line, the duration of the call and the like. The audio player software in the main region in the memory is shifted to the sub-region, and reproduction of music is continued or temporally stopped. Also, with the activation of the telephone call software, a busy icon 10*g*

(pointer type) indicating that a user is in the middle of a phone call is automatically generated on the sub-display unit 142.

In addition, it is also possible to connect to the Internet during a phone call. For example, if the user wishes to access a web site to search for a restaurant, a predetermined operation is performed with the input/call keys 162 or the operation keys 164 of the operation unit 160 to thereby switch from the main display unit 122 to the sub-display unit 142. Then, the "i" icon 10b on the upper row of the sub-display unit 142 is selected.

Figure 12:
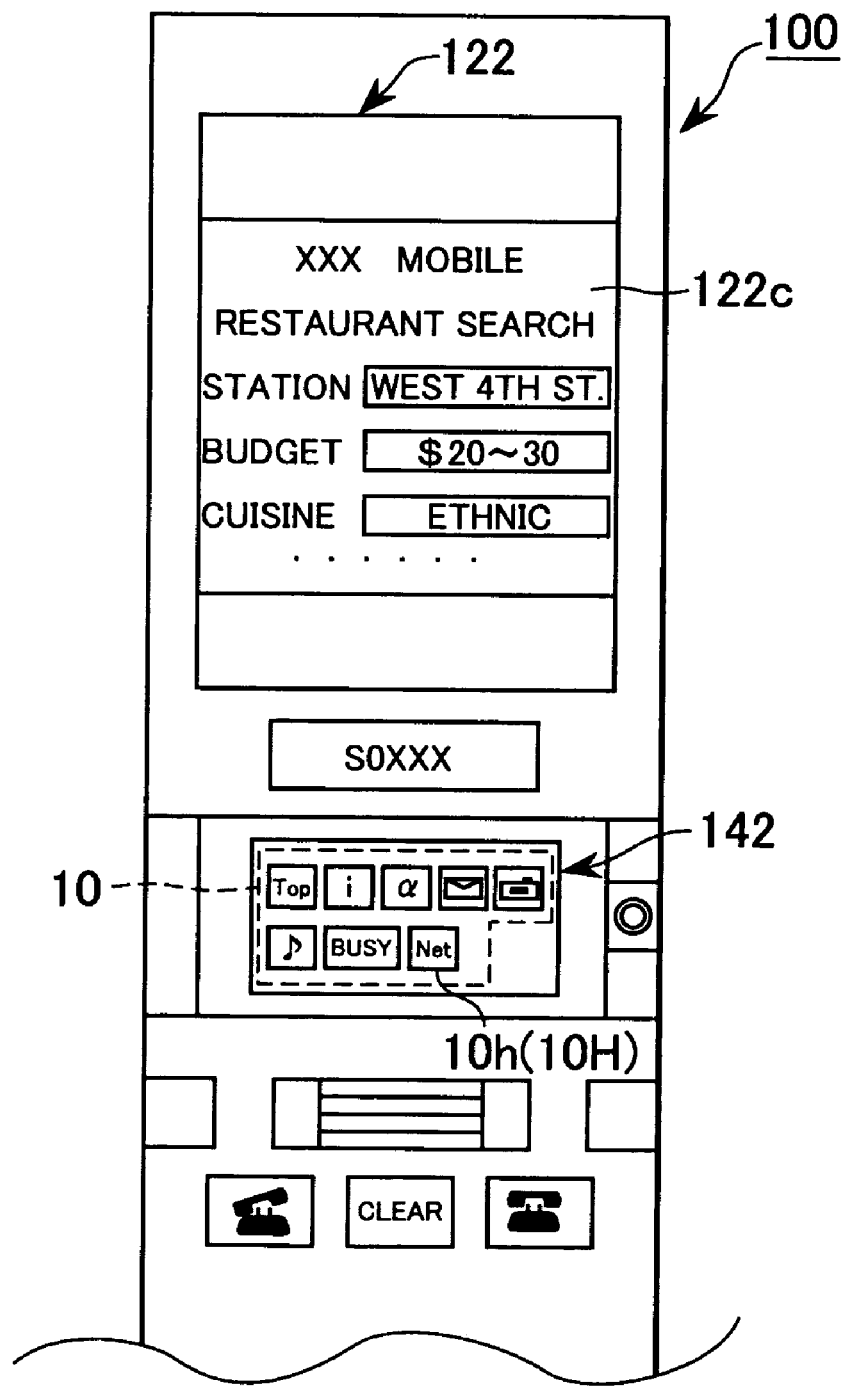
FIG. 12 is an explanatory view showing an example of a specific operation of the portable telephone shown in FIGS. 1A and 1B.

When the "i" icon 10b is selected, a net connection software is activated, and a web browser is displayed on the main display unit 122. Then, a desired web site is found and accessed via the Internet, and a restaurant search screen is displayed on the main display unit 122 as shown in FIG. 12. At this point, the call software processed in the main region of the memory is shifted to the sub-region, and processing of the phone call is continued. In addition, with the activation of the net connection software, a "Net" icon 10h (pointer type) is automatically generated on the sub-display unit 142.

Then, in the restaurant search screen 122c, station name, budget, kind of cuisine and the like, for example, are inputted, and information on restaurants (such as telephone number and a map) which match the search conditions is displayed on the main display unit 122.

At this point, a copy type (reduction copy type) icon 10H for the displayed screen may be generated and displayed on the sub-display unit 142 through a predetermined operation with the input/call keys 162 of the operation unit 160 or the operation keys 164, or the displayed screen may be saved as a copy type (reduction copy type) icon to replace the "Net" icon 10h (pointer type) when the net connection software is terminated. The icon 10h for the net connection software may also be erased automatically after a predetermined period has elapsed.

Moreover, if it is desired that the information (the displayed screen) retrieved in the restaurant search screen 122c of FIG. 12 be sent via e-mail, it is switched from the main display unit 122 to the sub-display unit 142 through a predetermined operation of the input/call keys 162 or the operation keys 164, and the mail icon 10d (illustrated with a drawing of an envelope in the diagram) on the top row of the sub-display unit 142 is selected.

Figure 13:
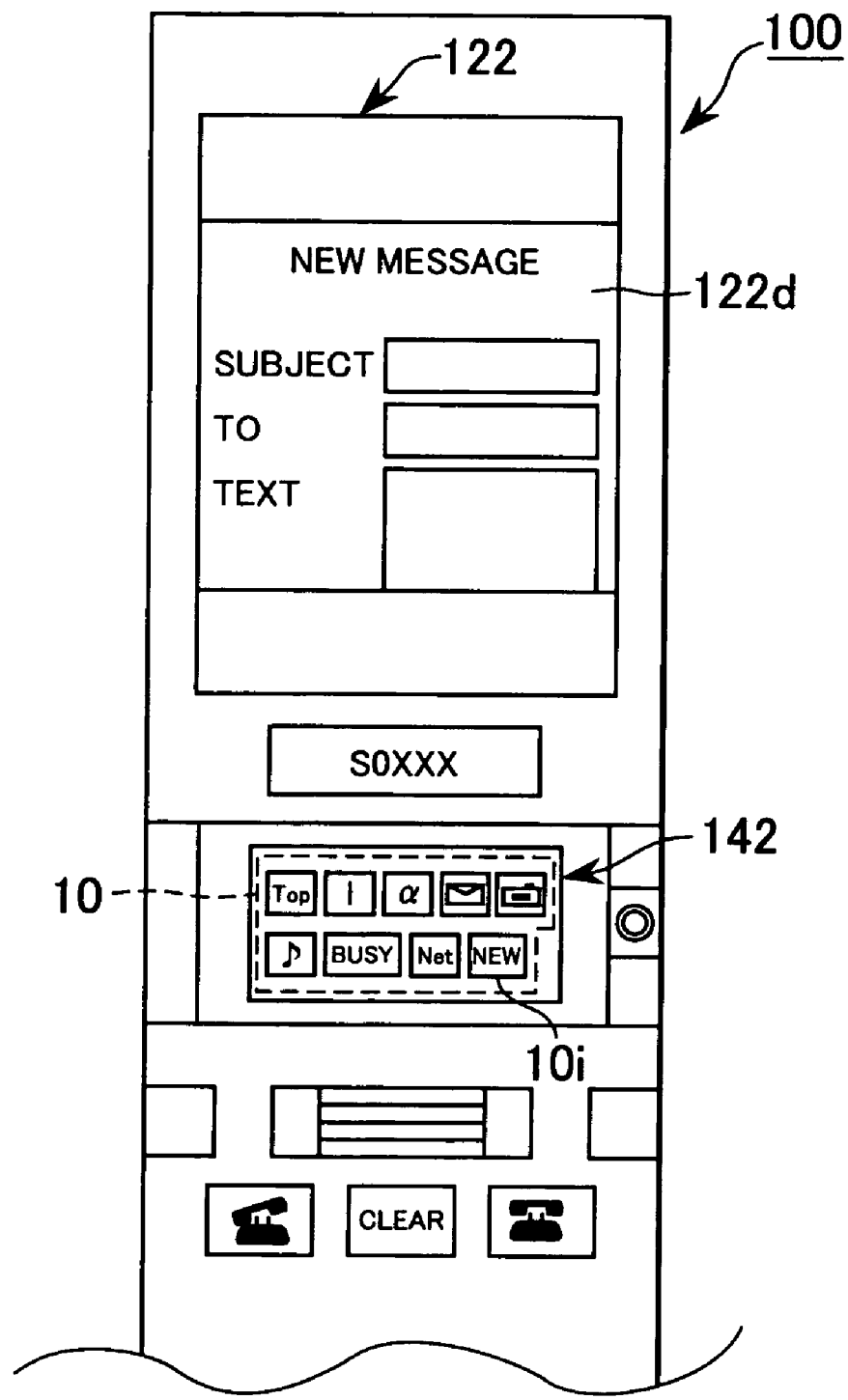
FIG. 13 is an explanatory view showing an example of a specific operation of the portable telephone shown in FIGS. 1A and 1B.

When the mail icon 10d is selected, the e-mail software is activated, and a screen for creating a new message 122d shown in FIG. 13 is displayed on the main display unit 122. At the same time, a "New" icon 10i (pointer type) is automatically generated on the sub-display unit 142.

Then, items such as title, addressee, main text or the like may be inputted through the input/call keys 162 or the operation keys 164 of the operation unit 160, and the icon 10H is attached. When the thus generated message is transmitted or saved, the "New" icon 10i of the sub-display unit 142 is automatically erased (returns to the state shown in FIG. 12).

Subsequently, when Internet connection is terminated (refer to FIG. 11) and the phone connection is cut, the "Net" icon 10h and the "busy" icon 10g of the sub-display unit 142 are automatically erased, and music reproduction is resumed automatically or manually (returns to the state shown in FIG. 10).

At this point, if the "♪" icon 10f is a pointer type icon, music reproduction has been ongoing, and thus when the music reproduction software is automatically or manually reactivated after the phone call is terminated, music reproduction is resumed in a condition where a certain period of time has elapsed. If, on the other hand, the "♪" icon 10f is a copy type icon, music reproduction is in a state in which it is temporarily stopped. When the audio player software is automatically or manually reactivated after the call is terminated, music is reproduced from the point at which it was stopped. Regardless of whether the icon is of a pointer type or a copy type, when the audio player software is reactivated, the main display unit 122 displays the audio screen 122e.

Figure 9:
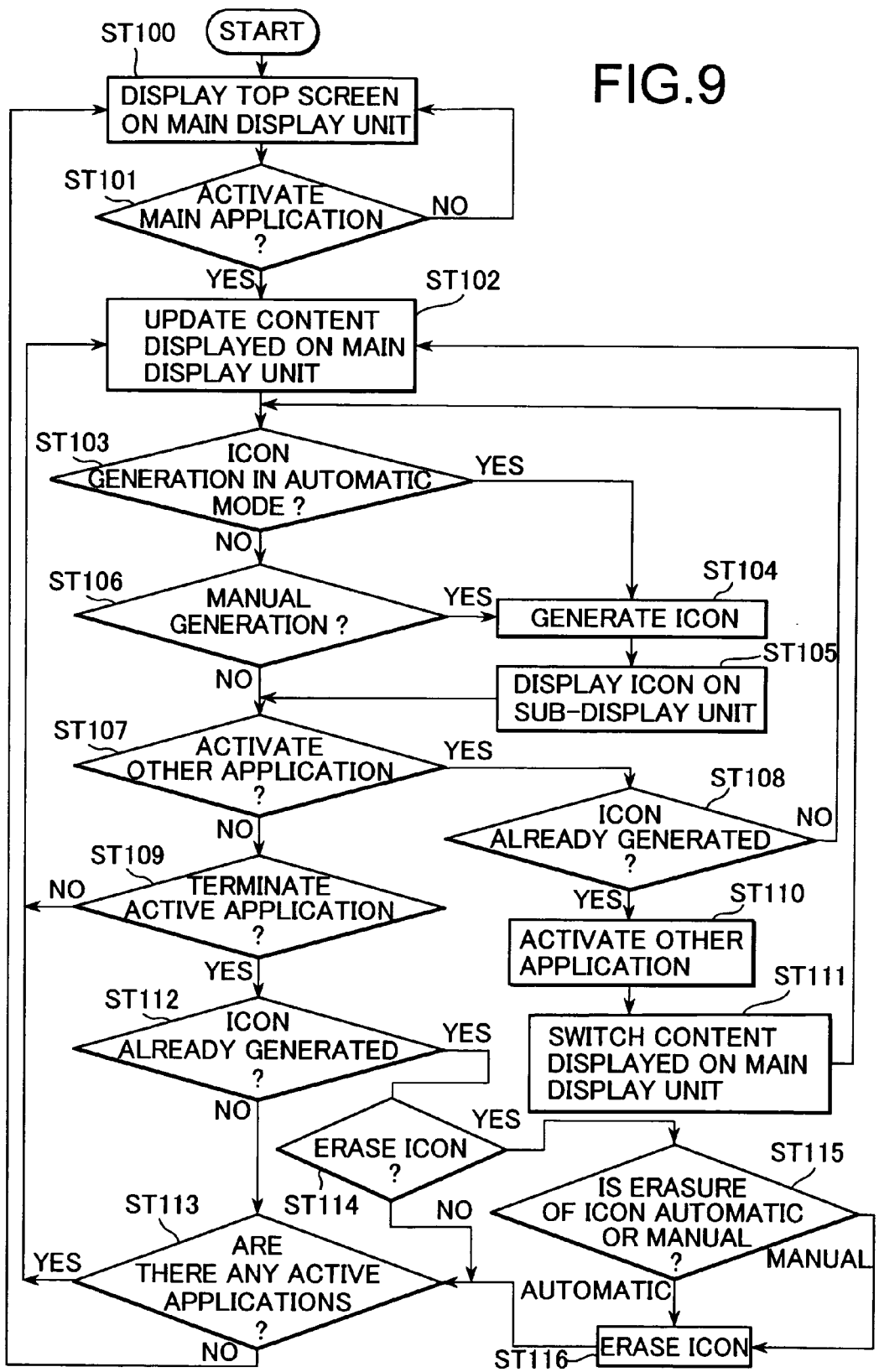
FIG. 9 is a flowchart showing an example of a task display switching method in the portable telephone shown in FIGS. 1A and 1B.

When each of the application software is successively terminated, according to the operational flow of FIG. 9, the top (initial) screen is displayed on the main display unit 122. However, if, as in the case above, a process in which the application software used most recently is displayed is adopted, the restaurant search screen 122c (refer to FIG. 12), for example, is displayed on the main display unit 122. If, on the other hand, a process in which the application software whose data is updated most frequently is displayed is adopted, the call data screen 122b (refer to FIG. 11. However, it is assumed here that the call data is updated most frequently), for example, is displayed on the main display unit 122.

In addition, for the icons illustrated in FIGS. 10 through 13, "♪," for example, is used for music reproduction, and "busy" is used for the call mode, and the icons are automatically selected in accordance with the application software. However, it is naturally possible to use other methods, such as making a selection each time an icon is generated, or assigning an icon by order, or the like.

Figure 14:
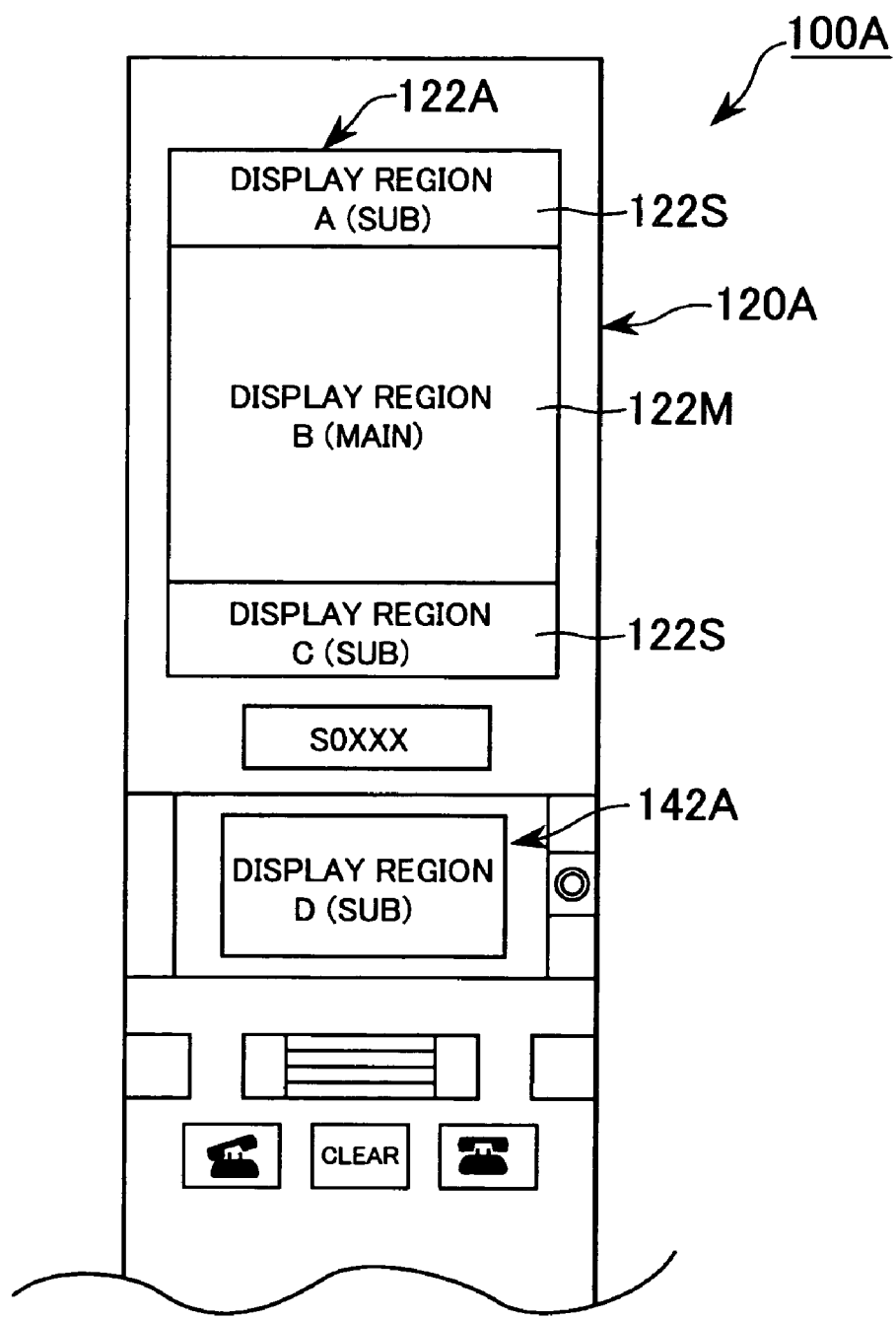
FIG. 14 is an explanatory view showing an example of display positions for the main display unit and the sub-display unit of the portable apparatus and the portable communications apparatus according to the present invention.

Further, the main display unit 122 (one display screen) provided on the display unit 120 may be divided into a main display area and a sub-display area. For example, as shown in FIG. 14, in a display unit 120A, if the main display area is set to be a display region (B) 122M, the sub-display area may be displayed in an upper portion of a display unit 122A as a display region (A) 122S, or it may be displayed in the lower portion of the display unit 122A as a display region C (sub) 122S. Moreover, it is naturally possible to place one of the main display area and the sub-display area on the right and the other on the left, or to alternate between the main and the sub-display areas as required, or place the main and sub-display areas in positions other than those described above. Still further, the sizes of the display regions of the main display area and the sub-display area may be set arbitrarily.

Thus, in a portable telephone, other than the foldable portable telephone 100 equipped with the main display unit 122 and the sub-display unit 142 as separate display screens as mentioned above, in which only one display unit is provided, similar functionality is still achievable if the one display unit is divided, as shown in FIG. 14, into a main display area and a sub-display area. Therefore, functionality similar to those described herein may naturally be attained in apparatuses other than a portable telephone apparatus regardless of whether or not they are of a foldable type and of whether or not they are equipped with a plurality of display units.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A mobile phone comprising:
an operation unit configured to receive user input on the mobile phone;
a display unit including a main display area and a sub display area;
a speaker configured to be used for phone conversation and audio reproduction on the mobile phone;
a memory storing a plurality of software applications executable on the mobile phone, the software applications including an e-mail software and an web browser, the web browser providing a search operation on the Internet, the memory further storing identification information including a telephone number;
a short-range communication unit configured to provide short-range wireless communication;
a modulator configured to modulate a transmission signal for phone call operation of the mobile phone;
a demodulator configured to demodulate a reception signal for the phone call operation of the mobile phone;
a signal processor configured to process a demodulated signal from the demodulator and to output the transmission signal to the modulator;
an operating system executable on the mobile phone for controlling the mobile phone; and
a controller configured to operate in a first mode of operation at some times and to operate in a second mode of operation at other times, wherein during the first mode of operation the controller causes status information including at least one of signal field strength, remaining battery life, and time to be displayed on the sub display area, and wherein during the second mode of operation the controller causes (a) a top screen to be displayed on the main-display area when none of the software applications is active, (b) an icon corresponding to one of the software applications to be displayed on the sub-display area when one of the software applications is active and a predetermined operation is performed on the operation unit, and (c) a displayed screen on the main-display area to be switched in response to an activation of the one of the software applications corresponding to the icon,
wherein the mobile phone is configured to perform a plurality of tasks including at least two of the plurality of software applications in parallel.

2. The mobile phone of claim 1, wherein the controller is further configured to display an audio screen on the main display area of the display when the audio reproduction of audio data stored on the memory is executed, and to display a call data screen on the main display area and stop the audio reproduction when a phone call is received during the audio reproduction.

3. The mobile phone of claim 2, wherein the controller is further configured to stop the audio reproduction temporarily when displaying a call data screen on the main display area.

4. The mobile phone of claim 1, wherein the plurality of software applications includes an audio player software application, and the icon displayed on the sub display area corresponds to the audio reproduction application.

5. The mobile phone of claim 1, wherein the memory stores a Java program as one of the plurality of software applications.

6. The mobile phone of claim 1, wherein the controller is configured to display a preset screen as the top screen.

7. The mobile phone of claim 1, further comprising: a camera configured to capture images on the mobile phone.

8. The mobile phone of claim 1, further comprising: a hinge connecting the display unit and the operation unit such that the display unit and the operation unit can rotate with respect to each other.

9. The mobile phone of claim 1, wherein each of the at least two of the plurality of software applications operating in parallel is represented by a separate icon displayed in the sub display area.

10. The mobile phone of claim 1, wherein if an icon representing an executing software application is selected from among icons being displayed in the sub display area, the controller displays the executing software application associated with the selected icon in the main display area.

11. The mobile phone of claim 1, wherein the controller is further configured to, during the second mode of operation, always display an icon in the sub display area representing a software application, and to activate the software application when the icon in the sub display area representing the software application is selected.

12. The mobile phone of claim 1, wherein the controller is further configured to, during the second mode of operation, display an icon representing the top screen in the sub display area.

13. The mobile phone of claim 1, wherein the controller is a separate element from the signal processor.

* * * * *